April 25, 1967 R. D. LLOYD 3,316,027
APPARATUS AND METHOD FOR DISCHARGING RECEPTACLES
Filed Jan. 4, 1965 2 Sheets-Sheet 1
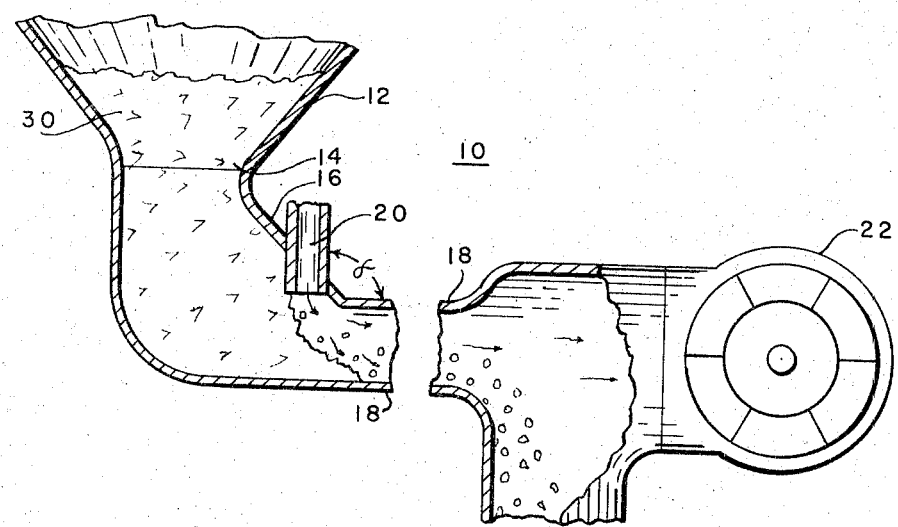
Fig. I
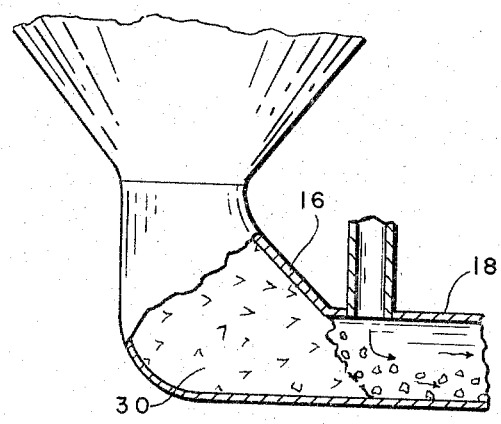
Fig. II
ROBERT D. LLOYD INVENTOR.
BY James P. Sogomasini
ATTORNEY.

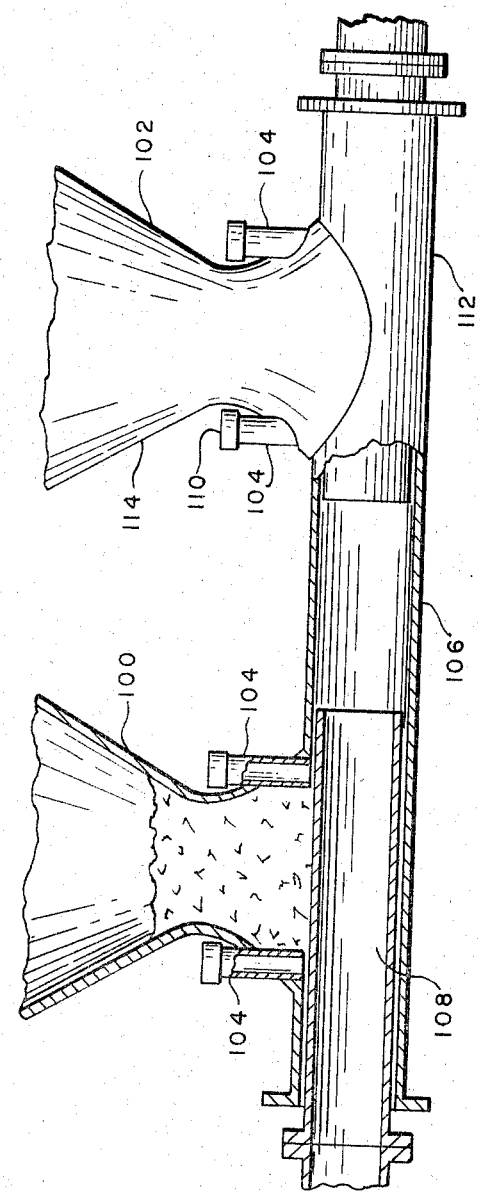

United States Patent Office 3,316,027
Patented Apr. 25, 1967

3,316,027
APPARATUS AND METHOD FOR DISCHARGING RECEPTACLES
Robert D. Lloyd, North Wilbraham, Mass., assignor to Monsanto Company, St. Louis, Mo., a corporation of Delaware
Filed Jan. 4, 1965, Ser. No. 422,967
1 Claim. (Cl. 302—52)

This invention relates to improved apparatus for unloading receptacles. More particularly, this invention relates to an improved unloading apparatus wherein a vacuum unloading device is utilized.

Manual transfer of large quantities of finely divided material from one location to another is no longer considered economically feasible. Consequently, various automatic systems have been designed such as, for example, pneumatic systems which convey the material from one point to another in an air current. Unfortunately, the effect of this type of system has been severely limited by operational problems, the most important of which is the tendency of the finely divided material which is being discharged from a receptacle or hopper to bridge or plug particularly if the material is not being properly metered from the receptacle into the conveying air stream.

Accordingly, it is the primary object of this invention to provide an improved unloading apparatus.

It is another object of this invention to provide unloading apparatus which can be used to quickly discharge finely divided materials from a receptacle into a transfer conduit without interruption due to material holdup.

It is another object of this invention to provide unloading apparatus which does not require metering means to control the flow of material from the receptacle to the transfer conduit.

It is a further object of this invention to provide unloading apparatus which is adapted to eliminate bridging which sometimes occurs when finely divided materials are being discharged from a receptacle into a transfer conduit.

These and other objects are attained in an apparatus which comprises, in combination, a receptacle, capable of containing finely divided material, having a discharge opening disposed in the bottom thereof, a material transfer conduit positioned under and in communication with said discharge opening, a vacuum source associated with said transfer conduit capable of exerting a negative pressure in the vicinity of said discharge opening, and a sleeve member penetrating said transfer conduit adjacent said discharge opening.

The following drawings are provided for the purpose of illustrating various embodiments of the present invention.

FIGURE I is a side view, partly in section and with parts broken, illustrating an embodiment of the present invention.

FIGURE II is a side view, partly in section and with parts broken, illustrating the same embodiment shown in FIGURE I except that the sleeve member is displaced further away from the hopper discharge.

FIGURE III is a side view, partly in section and with parts broken, illustrating the present invention as may be utilized to unload a plurality of hoppers.

Referring in detail to the figures of the drawings and more specifically FIGURE I, there is schematically shown a hopper unloading system 10 which comprises a hopper 12, having a discharge opening 14 disposed in the bottom of hopper 12 which is connected via diverging collar 16 to a substantially horizontal material transfer conduit 18. Inserted into the diverging collar 16 is a sleeve member 20 which extends down to about a level coextensive with the top of the substantially horizontal material transfer conduit 18. The material transfer conduit 18 is connected to a source of vacuum such as the suction pump 22 shown in FIGURE I, down stream from hopper 12. In addition, it should be noted in this embodiment that the hopper 12 does not have a gate or seal-off slide at the discharge opening 14 so that finely divided material 30 within hopper 12 extends down and completely fills the diverging collar portion and material transfer conduit section directly below the hopper.

In operation, a vacuum or negative pressure is applied in the vicinity of the hopper discharge through the material transfer conduit 18 by suitable vacuum forming means, for example an air pump or exhaust fan. This vacuum or negative pressure causes air to be drawn in through the sleeve member 20 which picks up finely divided material 30 in its path and conveys the material along transfer conduit 18. As material 30 is conveyed away, additional material flows down by gravity into the path of the incoming air. Consequently in a rather simple but unique method, hopper 12 can be unloaded while avoiding any shut off means at the hopper discharge opening 14 which might tend to cause material bridging problems particularly in those instances where the shut off means must be only partly opened to control the amount of material discharging into the material transfer conduit. In essence, no control on the amount of material dropping into the transfer conduit is necessary.

In the preferred embodiment, sleeve member 20 is inserted into a diverging collar section connected to the discharge opening of the hopper. However, it is possible to insert the sleeve member into the material transfer conduit or partly within the diverging collar and partly within the material transfer conduit. FIGURE II shows an embodiment where the sleeve is inserted into the material transfer conduit. It is obvious that the sleeve cannot be displaced very far from the collar if the air coming in through the sleeve member is to pick up finely divided material in the section of the conduit below the hopper.

FIGURE III discloses the invention as it could be used to unload a series of hoppers, for example, hoppers 100 and 102. In this embodiment sleeve members 104 are placed on both sides of the hoppers so that the finely divided material can be drawn along either direction of the transfer conduit 106. Also shown in FIGURE III is a simple but rather unique hopper bottom closure which cooperates well with the unloading system herein presented. More specifically, a hollow tube 108 is fitted in the end of conduit 106 extending just past the discharge opening of hopper 100 thereby preventing material in hopper 100 from flowing within the conduit 106. In order to discharge hopper 100, tube 108 is simply withdrawn out of conduit 106. The sleeve members 104 are all capped. When a hopper is to be discharged, the cap is removed on the same side as the vacuum source.

Rotatably mounted tubes inserted in conveying conduits below a hopper discharge have been effectively used as valves in the past. However, these tubes are not designed to be completely withdrawn from the conduit but rather are provided with lateral openings or contoured ends to permit a gradual opening as the tube is either revolved or partially withdrawn along the conduit thereby preventing material from plugging within the conduit, i.e., 106. Unfortunately, packing of material between the tube's outer surface and the inner surface of the conduit cause these valves to jam tending to make them inoperative and difficult to maneuver at critical stages. In addition, the partially open valve at times tends to create bridging problems above the valve by the restriction of he free gravitational flow of the material from the hopper. Therefore, the prime advantage of the rather simple tube device illustrated in FIGURE III is that the discharge opening is either completely closed or completely open thereby minimizing the tendency to bridge above the valve. Furthermore, after it is withdrawn from the conduit 106, it is possible to manually clean it and replace it when the hopper is empty.

The operation for discharging multiple hoppers in sequence may be illustrated with reference to FIGURE III. When the apparatus is used in conjunction with the hollow tube previously described, the sequence is generally as follows:

Cap 110 on the sleeve located on the left side of hopper 102 is removed after which tube 112 at the opposite end of conduit 106 shown in FIGURE III is gradually withdrawn out of said conduit. This permits finely divided material 114 to drop by gravity into the conduit 106. At the same time a vacuum is applied by vacuum means not shown from the left end of the conduit causing air to flow into the uncapped sleeve member and along the conduit past hopper 100. Material discharging from hopper 102 into conduit 106 falls into the path of the air flow in conduit 106 which conveys the material through the hollow tube 108 and out of the system. After hopper 102 has been emptied, tube 108 is then withdrawn and tube 110 re-inserted so that hopper 100 may be emptied in a similar manner.

In general, the present invention comprises allowing finely divided material to drop freely from a receptacle to a material transfer conduit below the receptacle and causing a flow of air, created by vacuum means, to enter a sleeve member adjacent the receptacle and to pick up and convey the finely divided material along the conduit to its destination.

In general, the optimum volume of air flowing through the sleeve member will vary depending on the type of material being conveyed and the respective cross-sections of the material transfer conduit and the valve sleeve member. The cross-section of the valve sleeve member may vary within wide limits but is generally less than the cross-section of the material transfer conduit. For optimum results, the cross-section of the sleeve member should be ¼ to ¾ or more preferably ⅓ to ½ times the cross-sectional area of the material transfer conduit. The velocity of the air entering the sleeve member is considered important and will generally vary depending for the most part on the type of material being transported. Some materials will be heavier than others or have a greater tendency to pack thereby requiring higher velocities to loosen the surface material from the mass. Consequently, when determining the optimum air velocity, the bulk density and the packing properties of the material must be taken into account. In addition, the angle at which the sleeve member is directed into the material transfer conduit is important as well as the distance between the sleeve and the discharge collar connecting the hopper to the material transfer conduit. For optimum results, the downstream angle (this would be the angle α shown in FIGURE I) between the longitudinal axis of the material transfer conduit and the longitudinal axis of the sleeve member will vary between 45 to 135 and more preferably between 55 to 100 degrees.

As earlier indicated, the sleeve member is preferably inserted in a diverging collar member such as illustrated in FIGURES I and III. However, it is also possible to position the sleeve member in the material transfer conduit close to the collar portion connecting the receptacle to the transfer conduit. The important consideration is that the sleeve member be positioned close enough to the mass of the finely divided material residing in the portion of the conduit below the receptacle to permit the air flow to sweep and thus convey the material away. On the other hand, the sleeve member should not be inserted so close to the middle of the discharge collar within the mass of the finely divided material that considerable resistance to air flow is encountered.

Although the embodiment which is illustrated employs a circular discharge and a cylindrical conveying tube, it is obvious that any cross-sectional shape may be utilized. For example, square, rectangular, hexagonal, etc., cross-sectional devices may be used if desired. In addition, if the cylindrical inner tubular member is used instead of a gate valve, it is obvious that its shape will conform to the conveying duct in which it is used. As pointed out, the relative size of the transfer conduit and the valve sleeve member are important while the size of the receptacle or hopper which is employed is not considered critical. Likewise, the wall thickness of the transfer conduit and hopper are not critical and will be determined by the type of materials being utilized and the size of the structure. These wall structures may vary from rather thin, e.g., 1/16 inch to reasonably thick, e.g., ¾ inch.

The materials of construction used in the practice of this invention are not critical and will be determined by persons skilled in the art to achieve maximum utility with minimum weight. For example, typical materials of construction may include some of the better known metals such as steel, aluminum, bronze, etc., and may even include rigid plastics such as methacrylate resins, vinyl chloride polymers and copolymers, fluorocarbon polymers, polyamides, and the like.

The materials which may be unloaded by means of described apparatus are not critical and may be any of the various materials which are generally stored or transported in bulk, e.g., polystyrene pellets, polyvinyl chloride pellets, polyethylene pellets, polypropylene pellets, various copolymers of styrene, ethylene, propylene, etc., with other monomers, etc. The invention is most useful in the conveyance of finely divided materials which may range from very small particles to very large particles and which may range from almost liquid to very hard particles.

The invention has been illustrated with certain representative embodiments and details which have been shown for the purpose of illustration. It will be apparent to those skilled in the art that various changes and embodiments may be made without departing from the spirit and scope of the invention.

What is claimed is:

An apparatus designed to eliminate bridging when finely divided materials are being discharged from a receptacle into a transfer conduit which comprises, in combination, a receptacle, capable of containing finely divided material, having a discharge opening disposed in the bottom thereof, a material transfer conduit position under and in communication with said discharge opening, a vacuum source associated with said transfer conduit capable of exerting a negative pressure in the vicinity of said discharge opening, and an open sleeve member having a cross section ¼ to ¾ times the cross section of said material transfer conduit traversing the wall of said transfer conduit next to and downstream of said discharge opening at an angle traversing the surface of repose of material entering said material transfer conduit from said discharge opening.

References Cited by the Examiner

UNITED STATES PATENTS

| 600,547 | 3/1898 | Mazzanovich | 302—52 X |
| 2,190,727 | 2/1940 | McKenna | 302—57 X |
| 3,207,560 | 9/1965 | Brown | 302—52 |

FOREIGN PATENTS 535,555  11/1955  Italy.

ANDRES H. NIELSEN, *Primary Examiner.*

EVON C. BLUNK, *Examiner.*

A. L. LEVINE, *Assistant Examiner.*